No. 863,086. PATENTED AUG. 13, 1907.
E. NORTON.
CAN.
APPLICATION FILED FEB. 8, 1905.
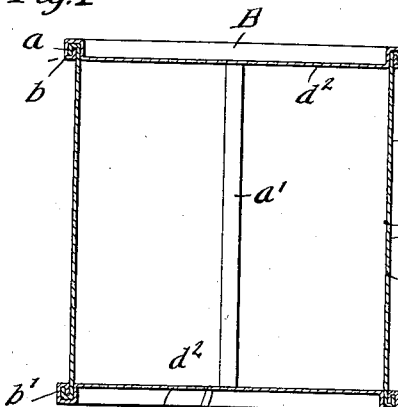
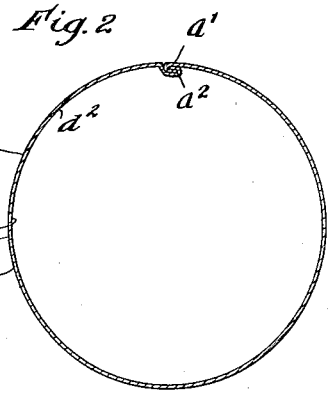
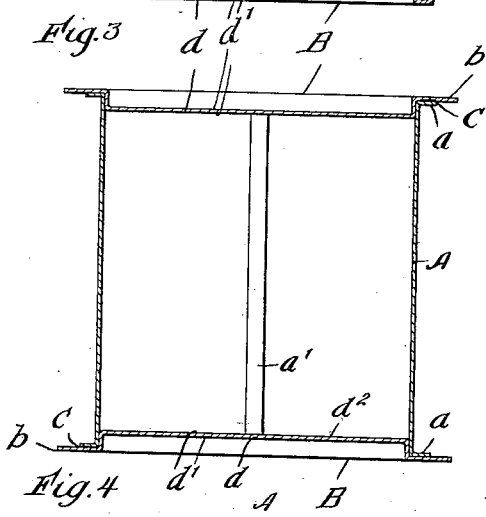
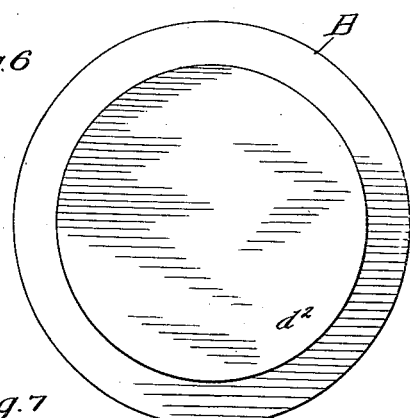
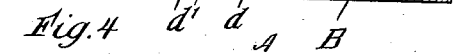
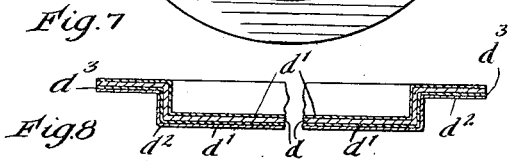
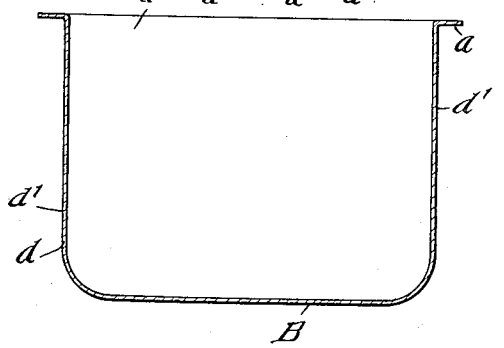
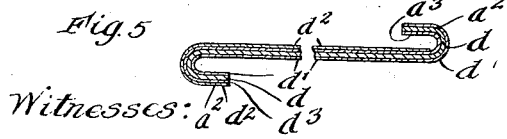
Witnesses:
Wm. Geiger
Inventor:
Edwin Norton
By Munday, Evarts & Adcock.
Attorneys

UNITED STATES PATENT OFFICE.

EDWIN NORTON, OF NEW YORK, N. Y., ASSIGNOR TO AUTOMATIC VACUUM CANNING COMPANY, OF CHICAGO, ILLINOIS, A CORPORATION OF ILLINOIS.

CAN.

No. 863,086.      Specification of Letters Patent.      Patented Aug. 13, 1907.

Application filed February 8, 1905. Serial No. 244,696.

*To all whom it may concern:*

Be it known that I, EDWIN NORTON, a citizen of the United States, residing in the city of New York, in the county of New York and State of New York, have invented a new and useful Improvement in Cans, of which the following is a specification.

My invention relates to improvements in sheet-metal preserving cans.

Sheet-metal preserving cans heretofore in use have been generally made on tin plate, iron or steel sheets coated on both sides with tin, their joints being generally united by solder. And considerable objection and difficulty has been experienced in their practical use, especially in preserving food products containing fruit or other acids or ingredients capable of attacking or destroying or being injuriously affected by the tin. And such vessels cannot be, or are not used at all for preserving a large variety of articles, such for example as pickles or other articles containing vinegar or like acids.

The object of my invention is to provide a sheet-metal preserving can or vessel of a simple, economical, efficient and durable construction, which will overcome the difficulties and objections heretofore experienced, and which will not injuriously affect or be injuriously affected by the contents of the can, and which may be successfully and practically used for preserving pickles, as well as other food products, which have heretofore been commonly preserved in sheet-metal vessels.

My invention consists in the means I employ to practically accomplish this object or result. That is to say it consists in a sheet-metal preserving can, composed preferably of tin plate and provided with an aluminium lining on the inside.

It also consists in the novel construction of parts and devices and in the novel combinations of parts and devices herein shown or described.

In the accompanying drawing, forming a part of this specification, Figure 1 is a central vertical section of a sheet-metal preserving can embodying my invention; Fig. 2 is a horizontal section; Fig. 3 is a central vertical section showing the can before the top and bottom heads are secured to the body; Fig. 4 is a plan view showing the inside surface of the sheet-metal blank from which the can body is formed; Fig. 5 is an enlarged detail section of the blank, showing the several thicknesses or coatings of which the blank is composed; Fig. 6 is a detail plan view showing the inside surface of the can head before it is secured on the can body; and Fig. 7 is an enlarged detail section showing the several thicknesses or coatings of which it is composed. Fig. 8 is a central vertical section of a modified form of body.

In the drawing A represents the can body and B B the top and bottom heads of the can. The body A has a seaming flange $a$ at each end which are interfolded with the seaming flange $b$ $b$ on the heads B into a double seam $b^1$, an interposed packing C being preferably used to insure the folded seams being hermetically tight. The can body A may preferably have a side seam $a^1$, composed of interengaging hooks or edge folds $a^2$ formed on the opposite ends of the sheet-metal blank, this seam being rendered hermetically tight by soldering.

The can body A and heads B of the can each comprise an iron or steel sheet $d$ having on one or both, preferably both sides, a tin coating $d^1$, and on the inside an aluminium lining $d^2$. The aluminium lining $d^2$ is preferably or most conveniently formed by first applying to the surface of the blank, or the sheet from which the blank is cut, a coating of size or varnish $d^3$, and then while it is yet sticky or tacky filling it with aluminium powder, or what is commonly known as aluminium bronze, and then subjecting it to a baking operation at a high heat, preferably about 300 degrees Fhr.

On the can body A at one or both ends thereof, a narrow strip $a^3$ is left or provided free from the aluminium bronze lining, and having a tinned or solderable surface or coating exposed, so that the overlapping surfaces of the can body at its side seam may have a tin to tin contact with each other to enable the side seam to be readily soldered in the usual manner by sweating solder into the folds of the seam. While I prefer to apply the aluminium lining $d^2$ in the manner above described, this aluminium lining may be applied in any suitable way, and while I prefer to have the tin coating $d^1$ upon both sides of the iron or steel sheet $d$ for facilitating cheapness and convenience of manufacture, it will be understood that the tin coating upon the inside surface may be omitted, if desired, excepting of course for the narrow strip $a^3$ at the side seam where a tin or other suitable soldering coating should be applied to facilitate the soldering of the side seam.

In Fig. 8 I show my invention as applied to a drawn or seamless can body in which the bottom head B' of the can is integral with the body, made without any side seam. I find, and have demonstrated by experiment that the aluminium lining applied to the blank before the can heads B B are drawn up, or the seamless can body A, drawn up in dies in the usual way, will not be injured, broken or its continuity injuriously affected by the drawing operation; but that on the contrary the action of the dies or drawing tools tend rather to compress, condense, compact and solidify the aluminium lining with the tin plate and to fill the pores of the metal. The aluminium lining thus acts as a protection to the tin coating of the sheet and prevents its being broken, attenuated or rendered porous by the drawing operation. The aluminium lining thus supplements and coacts with the tin coating of the iron or steel sheet, and renders the can absolutely safe and secure against attack or being injuriously affected by the contents of the can.

My improved sheet metal preserving cans have all the advantages of glass jars in preserving food products from taint, disagreeable flavor or injury, and in this respect are a very great improvement over the ordinary tin plate preserving cans heretofore in use.

I hereby disclaim as not of my invention the devices shown and described in the Maconochie reissue patent No. 11,935 of Oct. 8th. 1901, in the Cole patent No. 513,762 of Jan. 30th. 1894 and in the Coleman patents Nos. 682,173 and 682,174 of Sept. 10th. 1901.

This application for patent is filed as a substitute for and continuation of my original application, Serial No. 153,005, filed April 17th. 1903.

I claim:

1. An hermetically closed sheet metal preserving can composed of tin plate having a protective non flavoring, non-poisonous aluminium lining, unaffected by food juices or acids, on the inside, said can having a head united to its body by a folded seam, and said aluminium lining extending between the folds of said seam, substantially as specified.

2. A sheet metal preserving can composed of tin plate, having an aluminium lining on the inside and a soldered side seam, the contacting surfaces of which seam are of tin, substantially as specified.

3. An hermetically closed sheet metal preserving can composed of tin plate, having a protective non-flavoring, non-poisonous aluminium lining unaffected by food juices or acids on the inside consisting of size or varnish filled with aluminium powder or bronze, said can having a head united to its body by a folded seam, and said aluminium lining extending between the folds of said seam, substantially as specified.

4. An hermetically closed sheet metal preserving can composed of tin plate, having a protective non-flavoring, non-poisonous aluminium lining unaffected by food juices or acids on the inside, consisting of baked size or varnish, filled with aluminium powder or bronze, said can having a head united to its body by a folded seam, and said aluminium lining extending between the folds of said seam, substantially as specified.

5. An hermetically closed sheet metal preserving can composed of tin plate, having a protective non-flavoring non-poisonous lining unaffected by food juices or acids on the inside consisting of baked size or varnish filled with metallic bronze, said can having a head united to its body by a folded seam, and said lining extending between the folds of said seam, substantially as specified.

6. An hermetically closed sheet metal preserving can having a protective non flavoring, non poisonous aluminium lining unaffected by food juices or acids on the inside thereof, consisting of size or varnish filled with aluminium powder or bronze, said can having a head united to its body by a folded seam, and said aluminum lining extending between the folds of said seam, substantially as specified.

EDWIN NORTON.

Witnesses:
ALPHONSE KLOH,
GERTRUDE LEFKOWITZ.